United States Patent
Dudar et al.

(10) Patent No.: US 10,272,771 B2
(45) Date of Patent: Apr. 30, 2019

(54) METHODS AND SYSTEMS FOR AGING A FUEL TANK IN A PLUG-IN HYBRID ELECTRIC VEHICLE

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US); Larry Castleberry, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 15/178,797

(22) Filed: Jun. 10, 2016

(65) Prior Publication Data

US 2017/0355260 A1   Dec. 14, 2017

(51) Int. Cl.
| | | |
|---|---|---|
| *B60K 15/00* | (2006.01) | |
| *B60K 15/03* | (2006.01) | |
| *B60W 20/00* | (2016.01) | |
| *F02D 41/30* | (2006.01) | |
| *F02D 41/24* | (2006.01) | |
| *F02D 41/26* | (2006.01) | |
| *B60L 11/18* | (2006.01) | |
| *B60K 6/40* | (2007.10) | |
| *B60K 15/073* | (2006.01) | |
| *B29C 71/00* | (2006.01) | |
| *B29L 31/00* | (2006.01) | |

(52) U.S. Cl.
CPC ........ *B60K 15/03177* (2013.01); *B29C 71/00* (2013.01); *B60K 6/40* (2013.01); *B60K 15/073* (2013.01); *B60L 11/1816* (2013.01); *B60W 20/00* (2013.01); *F02D 41/2406* (2013.01); *F02D 41/26* (2013.01); *F02D 41/3082* (2013.01); *B29L 2031/7172* (2013.01); *B60K 2015/0319* (2013.01); *B60K 2015/03493* (2013.01); *B60W 2560/00* (2013.01); *B60Y 2200/92* (2013.01); *B60Y 2400/10* (2013.01); *Y10S 903/904* (2013.01); *Y10S 903/951* (2013.01)

(58) Field of Classification Search
None
See application file for complete search history.

(56) References Cited

U.S. PATENT DOCUMENTS

| | | | |
|---|---|---|---|
| 6,405,744 B1 | 6/2002 | LaPlant | |
| 8,201,596 B2 | 6/2012 | Reddy | |
| 9,026,345 B2 | 5/2015 | Dudar et al. | |
| 2008/0014390 A1 | 1/2008 | Scott et al. | |
| 2013/0030616 A1* | 1/2013 | Syed | F02D 41/0025 701/22 |
| 2014/0297071 A1 | 10/2014 | Dudar et al. | |
| 2018/0170173 A1* | 6/2018 | Grunwald | B60K 15/035 |

* cited by examiner

*Primary Examiner* — James M McPherson
(74) *Attorney, Agent, or Firm* — Julia Voutyras; McCoy Russell LLP

(57) ABSTRACT

Methods and systems are provided for aging a new plastic fuel tank in a vehicle. In one example, during a plug-in event to recharge a battery of the vehicle, the fuel tank is isolated and the fuel pump is actuated to agitate fuel within the tank and increase fuel vapors until the plastic fuel tank becomes aged to a predetermined degree by fuel vapors generated therein. In this manner, the fuel tank is aged more rapidly, resulting in more accurate fuel level readings and less noise and vibration.

9 Claims, 5 Drawing Sheets

METHODS AND SYSTEMS FOR AGING A FUEL TANK IN A PLUG-IN HYBRID ELECTRIC VEHICLE

FIELD

The present description relates generally to methods and systems for expediting aging of a new plastic fuel tank in a plug-in hybrid electric vehicle (PHEV).

BACKGROUND/SUMMARY

Plug-in Hybrid Electric Vehicles are propelled, depending on operating conditions, by either an electric motor or an internal combustion engine. An onboard battery is recharged either through the electric motor, which acts as a generator when the vehicle is slowing down, or through an onboard charging system that is plugged into the power grid by the operator when the vehicle is not in use.

A fuel vapor recovery system, which includes a fuel vapor canister, is coupled to the fuel tank to absorb fuel vapors which otherwise may be emitted to the atmosphere. When the internal combustion engine is operating, fuel vapors are desorbed from the canister and purged into the engine for combustion.

Plug-in Hybrid Electric Vehicles may be powered by the battery for long periods of time and vapors from the fuel tank may be infrequently purged into the engine for combustion. To prevent vapor emissions from the canister into the atmosphere under these conditions, the fuel tank is often sealed and not vented to atmosphere. Further, plastic fuel tanks are frequently utilized in PHEVs for their lighter weight, which improves fuel economy.

The inventors herein have recognized that new plastic fuel tanks may expand with age when fuel vapors chemically combine with the plastic tank. Depending on the operators driving habits, some PHEVs may infrequently use gasoline and the aging process may be prolonged.

Thus, the inventors herein have developed systems and methods to at least partially address the above issues. In one example the issues described above may be addressed by a method for a plug-in hybrid vehicle which comprises the following: during a plug-in event to recharge a battery of the vehicle, isolating a plastic fuel tank from both an internal combustion engine of the vehicle and from atmosphere; and operating a fuel pump coupled to the plastic fuel tank during each of a plurality of the plug-in events until the plastic fuel tank becomes aged to a predetermined degree by fuel vapors generated therein. In this manner, the fuel tank is aged more rapidly than would otherwise occur resulting in more accurate fuel level readings and less noise and vibration than heretofore possible.

In another example, the plastic fuel tank aging is directly related to temperature of fuel in the plastic fuel tank and the operating time of the fuel pump during the plug-in events. In another example, the plastic fuel tank aging is related to pressure in the plastic fuel tank during the plug-in events and the fuel pump is shut off when pressure in the plastic fuel tank reaches a preset pressure.

In still another example, a method for a plug-in hybrid vehicle, comprises: estimating aging of a plastic fuel tank which supplies fuel to a combustion engine of the vehicle in relation how much time the fuel tank is at a fuel level over a preset level and fuel temperature during those times; during plug-in events in which a battery of the vehicle is recharged from the power grid, sealing a plastic fuel tank which is coupled to an engine of the vehicle so that the plastic fuel tank is isolated from both the engine and from atmosphere; operating a fuel pump coupled to the plastic fuel tank during each of the plug-in events; estimating aging of the tank during each of the plug-in events and generating a total aging estimate from both filling the plastic fuel tank over the preset level and operating the fuel pump during the plug-in events; and stopping operation of the fuel pump during the plug-in events when the total aging estimate reaches the desired aging estimate.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for aging a deformable fuel tank, such as a plastic fuel tank. Plastic fuel tanks may be used in vehicles featuring a hybrid-electric propulsion system, such as the vehicle propulsion system shown in FIG. 1, in order to reduce the overall weight of the vehicle. Most hybrid-electric vehicles include an evaporative emissions system comprising a fuel tank isolation valve utilized to seal the fuel tank and prevent unwanted evaporative emissions. Such an evaporative emissions system is shown in FIG. 2 coupled to a fuel system, engine system, and emissions system. However, a new plastic fuel tank may undergo an aging process, wherein the new fuel tank expands by reacting with fuel vapors until a dimensional equilibrium is reached. Until the fuel tank is aged, the fuel level indications from a fuel level sensor within the fuel tank may be less accurate. Typically, in a vehicle propelled by internal combustion engine alone, the aging may occur more rapidly after a few full refueling events. However, in a HEV, when the engine is used infrequently, a duration for aging the fuel tank may increase. Consequently, fuel level indications may remain less accurate for a longer duration. Therefore, in order to accelerate aging of the fuel tank, an on-board aging process may be performed during vehicle-off conditions when an energy storing device of the HEV is charged via electrical energy from the grid. The vehicle may thus include a controller configured to perform an on-board aging routine, such as routine discussed at FIGS. 3A and 3B to expedite aging of the fuel tank. A timeline for an example on-board aging process is shown at FIG. 4.

Figure 1:
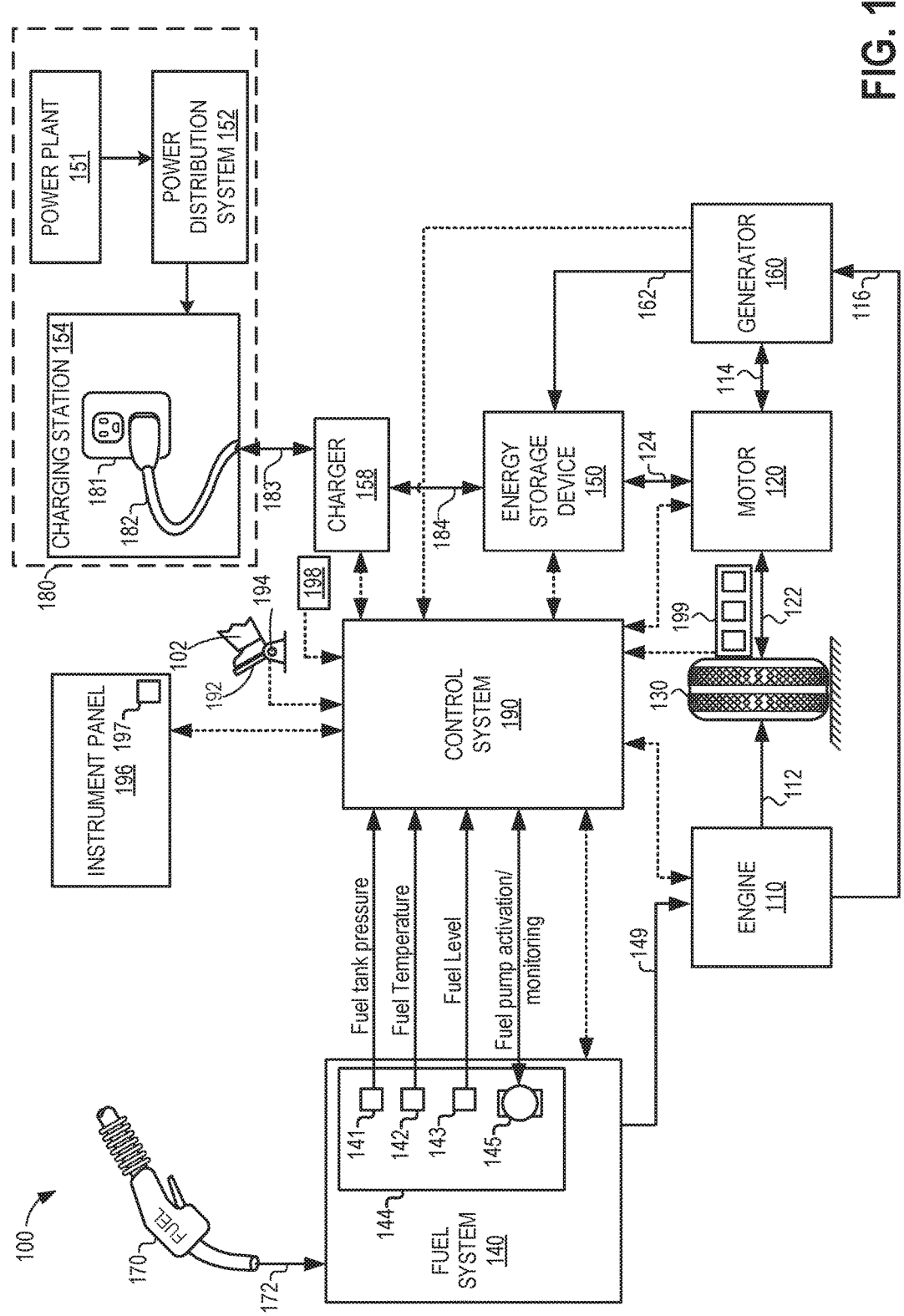
FIG. 1 illustrates an example vehicle propulsion system.
Figure 2:
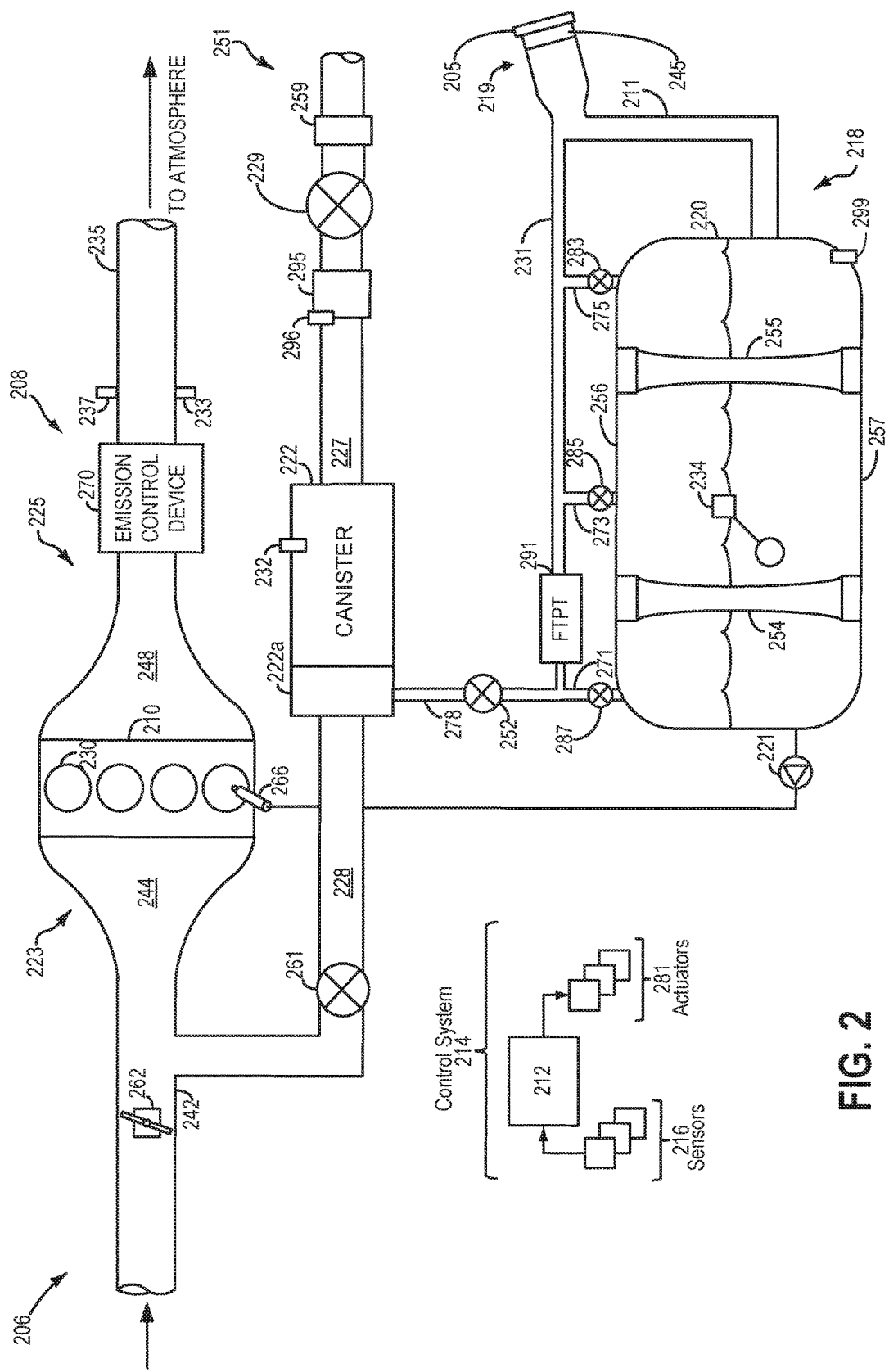
FIG. 2 schematically shows an example vehicle system comprising an engine system coupled to a fuel system and an evaporative emissions system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 149. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120, which may in turn provide a generator function to convert the engine output to electrical energy, where the electrical energy may be stored at energy storage device 150 for later use by the motor.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160 via a network, such as a vehicular controller area network (CAN). Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194, which communicates with pedal 192. Pedal 192 may refer schematically to a brake pedal and/or an accelerator pedal.

Energy storage device 150 may be periodically recharged by a recharging system 180 external to the vehicle (e.g., not part of the vehicle) as indicated by arrow 183. The recharging system 180 may include a power generating plant 151, a power distribution system 152 (also referred to herein as grid or power grid), and a plurality of charging stations 154 including one or more receptacles 181 that are electrically connected to the power distribution system 152. As a non-limiting example, vehicle propulsion system 100 may be configured as a plug-in hybrid electric vehicle (PHEV), whereby electrical energy may be supplied to energy storage device 150 from a power plant 151 via a power distribution system 152 and a charger 158. Charger 158 may be located on-board the vehicle and may be electrically coupled with energy storage device 150 and a transmission cable 182 that may be coupled to receptacle 181 via a plug. During a grid-powered recharging operation, the energy storage device 150 may receive electrical energy (e.g., current) from power distribution system 152 via charger 158. While the vehicle propulsion system is operated to propel the vehicle, electrical transmission cable 182 may disconnected between recharging system 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from charging station 154. For example, energy storage device 150 may receive electrical energy from a power source within the charging station via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may be a sealed or non-integrated refueling canister only system (NIRCOS). Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 149. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

Fuel system 140 may periodically receive fuel from a fuel source residing external to the vehicle. As a non-limiting example, vehicle propulsion system 100 may be refueled by receiving fuel at fuel tank 144 via a fuel-dispensing device 170 as indicated by arrow 172. In some embodiments, fuel tank 144 may be configured to store the fuel received from fuel dispensing device 170 until it is supplied to engine 110 for combustion. Fuel tank 144 may include a fuel pump 145 for pressurizing fuel delivered to engine 110. Fuel tank 144 may also include one or more sensors such as a fuel pressure sensor 141 for indicating pressure within the fuel tank, a fuel temperature sensor 142 for indicating a fuel temperature, and a fuel level sensor 143 for indicating a fill-level of the fuel remaining in the fuel tank. The fuel tank pressure, fuel temperature, and fuel level indications may be communicated to control system 190 within the vehicle. In some embodiments, the level of fuel stored at fuel tank 144 (e.g., as identified by the fuel level sensor) may be communicated to the vehicle operator, for example, via a fuel gauge or indication in a vehicle instrument panel 196.

Fuel tank 144 may include a fuel tank isolation valve (not shown), which may be configured as a normally closed valve. Thus, fuel tank may be a sealed fuel tank. HEVs may be configured with sealed fuel tanks in order to reduce canister overload during operating conditions of prolonged battery mode driving and thereby, reduce hydrocarbon emissions into the atmosphere.

Fuel tank 144 may be configured as a plastic fuel tank. New plastic fuel tanks may expand until a dimensional equilibrium is achieved. The dimensional equilibrium may allow a final fit (between the fuel tanks and holding straps) with the vehicle to be achieved. Until the dimensional equilibrium is reached, the fuel level indications may be inconsistent with the actual fuel level. For example, the indicated fuel level in a new fuel tank may be less than the actual fuel level. The process of a new fuel tank reaching the dimensional equilibrium is referred to herein as aging. A fuel tank that has achieved dimensional equilibrium is referred to herein as aged fuel tank. In a vehicle that is propelled exclusively by internal combustion engines, aging may occur more rapidly after a few full refueling events. The refueling vapors may adhere to the fuel tank, which cause the fuel tank walls to stretch.

However, in HEVs, the fuel tank may not be filled to a desired amount that facilitates aging of the fuel tank. Further, depending on an operator's driving habit, if the HEV is operated in the electric mode for long periods of time, the engine and hence, the fuel tank may not be operated for prolonged periods. Consequently, it may take a longer duration for the new fuel tank to age. As a result, fuel level indications remain irregular for a longer duration until the new fuel tank is aged.

The inventors herein have identified the above-mentioned issues with aging of a new fuel tank in HEVs, and have developed methods and systems to at least partially address these issues. In one example, aging of a new fuel tank installed in a HEV is expedited by an on-board aging process when the vehicle is in use by a consumer. The on-board aging process may include operating a fuel pump within the new fuel tank during key-off charging conditions when an energy storing device within the HEV is being charged by current from a power grid. By operating the fuel pump when the energy storing device is charged by the grid, a molar content of fuel in the fuel tank's vapor space may be increased. Thus, fuel vapors increase, which adhere to the fuel tank walls and expedite aging of the fuel tank.

The determination of whether the fuel tank is aged may be based on estimating a total aging coefficient. The total aging coefficient may be determined by the control system 190 based on one or more signals received from the one or more sensors within the fuel tank. In response to the total aging coefficient less than a threshold coefficient, during charging conditions when energy storage device 150 is drawing current from power distribution system 152, control system 190 may communicate with fuel pump 145 to activate fuel pump 145 for aging fuel tank 144. By activating fuel pump 145, fuel in fuel tank 144 may be agitated. As a result, fuel vapors may increase. The fuel vapors may react chemically with the fuel tank, which may cause the fuel tank to expand, and thereby reach equilibrium. Details of determining the total aging coefficient and the on-board aging process will be further elaborated with respect to FIGS. 3A, 3B, and 4. Briefly, the total aging coefficient may take into account a pre-conditioning of tank that was performed before the fuel tank was installed into the HEV. Further, the total aging coefficient may be based on fuel consumption, refueling and fuel sloshing in the HEV after the fuel tank is installed in the HEV and during use by a consumer. The total aging coefficient may be further based on a fuel level, ambient temperature, and an amount of time the fuel pump was operated during the on-board aging process.

One or more crash sensors 188 may be mounted to vehicle propulsion system 100. The sensor(s) may be operable to measure and/or detect a crash, in order to deploy and/or activate a safety device, such as the deployment of one or more air bags or the locking of seatbelt restraints. Illustrative crash sensors may include, but are not limited to: accelerometers, pressure transducers, thermocouples, load cells, deflection and contact sensors, and/or any other type of sensor that may trigger deployment of safety devices during a crash. In some examples, crash sensors 188 may be configured to enable tunable deceleration characteristics.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197, which may be manually actuated or pressed by a vehicle operator to initiate refueling. For example, as described in more detail below, in response to the vehicle operator actuating refueling button 197, a fuel tank in the vehicle may be depressurized so that refueling may be performed. In some examples, control system 190 may monitor a number of times the refueling button was actuated to estimate a number of refueling events.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. Vehicle system 206 may be an example of vehicle propulsion system 100 at FIG. 1. Vehicle system 206 includes an engine system 208 coupled to an emissions control system 251 and a fuel system 218. Fuel system 218 may be an example of fuel system 140 at FIG. 1. Emission control system 251 includes a fuel vapor container or canister 222, which may be used to capture and store fuel vapors. In some examples, vehicle system 206 may be a hybrid electric vehicle system.

The engine system 208 may include an engine 210 having a plurality of cylinders 230. Engine 210 may be an example of engine 110 at FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

The outer walls of fuel tank 220 may be composed of one or more flexible metal materials, and/or may be at least partially composed of polymer or plastic materials. By reducing the thickness and/or rigidity of the outer walls, fuel tank 220 may be reduced in weight, but may also be prone to deformation due to outward stress, pressure differentials, etc. As such, fuel tank 220 may comprise stanchions 254 and 255, which may support at least a portion of top wall 256 and bottom wall 257. Stanchions 254 and 255 may provide structural support and/or rigidity when fuel tank 220 is composed of a flexible or deformable material. Vapors generated in fuel system 218 may be routed to an evaporative emissions control system 251, which includes a fuel vapor canister 222 via vapor recovery line 231, before being purged to the engine intake 223. Vapor recovery line 231 may be coupled to fuel tank 220 via one or more conduits 278 and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves are provided in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283 The one or more vent valves may be electronically or mechanically actuated valves and may include active vent valves (that is, valves with moving parts that are actuated open or close by a controller) or passive valves (that is, valves with no moving parts that are actuated open or close passively based on a tank fill level). Based on a fuel level in the fuel tank 220, the vent valves may be open or closed. For example, GVV 287 may be normally open allowing for diurnal and "running loss" vapors from the fuel tank to be released into canister 222, preventing over-pressurizing of the fuel tank. However, during vehicle operation on an incline, when a fuel level as indicated by fuel level indicator 34 is artificially raised on one side of the fuel tank, GVV 287 may close to prevent liquid fuel from entering vapor recovery line 231. As another example, FLVV 285 may be normally open, however during fuel tank refilling, FLVV 285 may close, causing pressure to build in vapor recovery line 231 as well as at a filler nozzle coupled to the fuel pump. The increase in pressure at the filler nozzle may then trip the refueling pump, stopping the fuel fill process automatically, and preventing overfilling.

Further, in some examples, vapor recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe or neck 211. Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch, which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227, which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

Flow of air and vapors between canister 222 and the atmosphere may be regulated by a canister vent valve 229. Canister vent valve 229 (CVV) may be a normally open valve, so that fuel tank isolation valve 252 (FTIV) may control venting of fuel tank 220 with the atmosphere. In the present example, FTIV 252 is shown positioned between the fuel tank and the fuel vapor canister within conduit 278. However, examples where the FTIV is part of fuel tank 220 is also within the scope of this disclosure. FTIV 252 may be a normally closed valve, that when opened, allows for the venting of fuel vapors from fuel tank 220 to canister 222. Fuel vapors may then be vented to atmosphere via canister vent valve 229, or purged to engine intake system 223 via canister purge valve 261. During vehicle operating conditions when it is desirable to isolate the fuel tank (e.g., during on-board aging of the fuel tank) from the engine and the atmosphere, the FTIV 252 and CVV 229 may be closed.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 and canister vent valve 229 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 and canister vent valve 229, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 and canister vent valve 229 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

In yet another example, the fuel system may be operated during vehicle-off and key-off conditions to expedite aging of the fuel tank. For example, during early driving miles when vehicle 20 is a new vehicle and is in use by a consumer, fuel tank 220 may not be aged (that is, fuel tank may not be at dimensional equilibrium). In order to expedite aging of fuel tank 220, during conditions when an energy storage device of vehicle 206 is being charged with current from an electricity grid, controller 212 may isolate fuel tank 220 and activate fuel pump 221. For example, to isolate fuel tank, controller 212 may send electrical signals to actuators of FTIV 252 and CVV 229 to close the valves. To activate fuel pump 221, controller 212 may provide an electrical signal to a motor of fuel pump 221 to increase a speed of the motor. When the fuel pump is activated, fuel within fuel tank 220 is agitated, which increases fuel vapors within the fuel tank. The fuel vapors adhere to the walls of the fuel tank, which may cause the fuel tank to stretch. In this way, aging of a new fuel tank may be expedited. Details of the aging process will be further described with respect to FIGS. 3A, 3B, and 4.

Controller 212 may comprise a portion of a control system 214. Control system 214 may be an example of control system 190 at FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, fuel tank pressure sensor 291, fuel level sensor 234, fuel temperature sensor 299, ambient temperature sensor (not shown), and canister temperature sensor 232. Other sensors such as pressure, temperature, air/fuel ratio, and crash sensors may be coupled to various locations in the vehicle system 206. As another example, the actuators may include fuel injector 266, fuel pump 221, CVV 229, throttle 262, fuel tank isolation valve 252, ELCM 295, and refueling lock 245. As indicated above, the control system 214 may include controller 212. The controller may receive input data from the various sensors, process the input data, and trigger the actuators in response to the processed input data based on instruction or code programmed therein corresponding to one or more routines. An example control routine is described herein with reference to FIGS. 3A and 3B.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. Leak tests may be performed by an evaporative leak check module (ELCM) 295 communicatively coupled to controller 212. ELCM 295 may be coupled in vent 227, between canister 222 and the atmosphere. ELCM 295 may include a vacuum pump configured to apply a negative pressure to the fuel system when in a first conformation, such as when administering a leak test. ELCM 295 may further include a reference orifice and a pressure sensor 296. Following the applying of vacuum to the fuel system, a change in pressure at the reference orifice (e.g., an absolute change or a rate of change) may be monitored and compared to a threshold. Based on the comparison, a fuel system leak may be diagnosed. The ELCM vacuum pump may be a reversible vacuum pump, and thus configured to apply a positive pressure to the fuel system when a bridging circuit is reversed placing the pump in a second conformation.

Figure 3A:
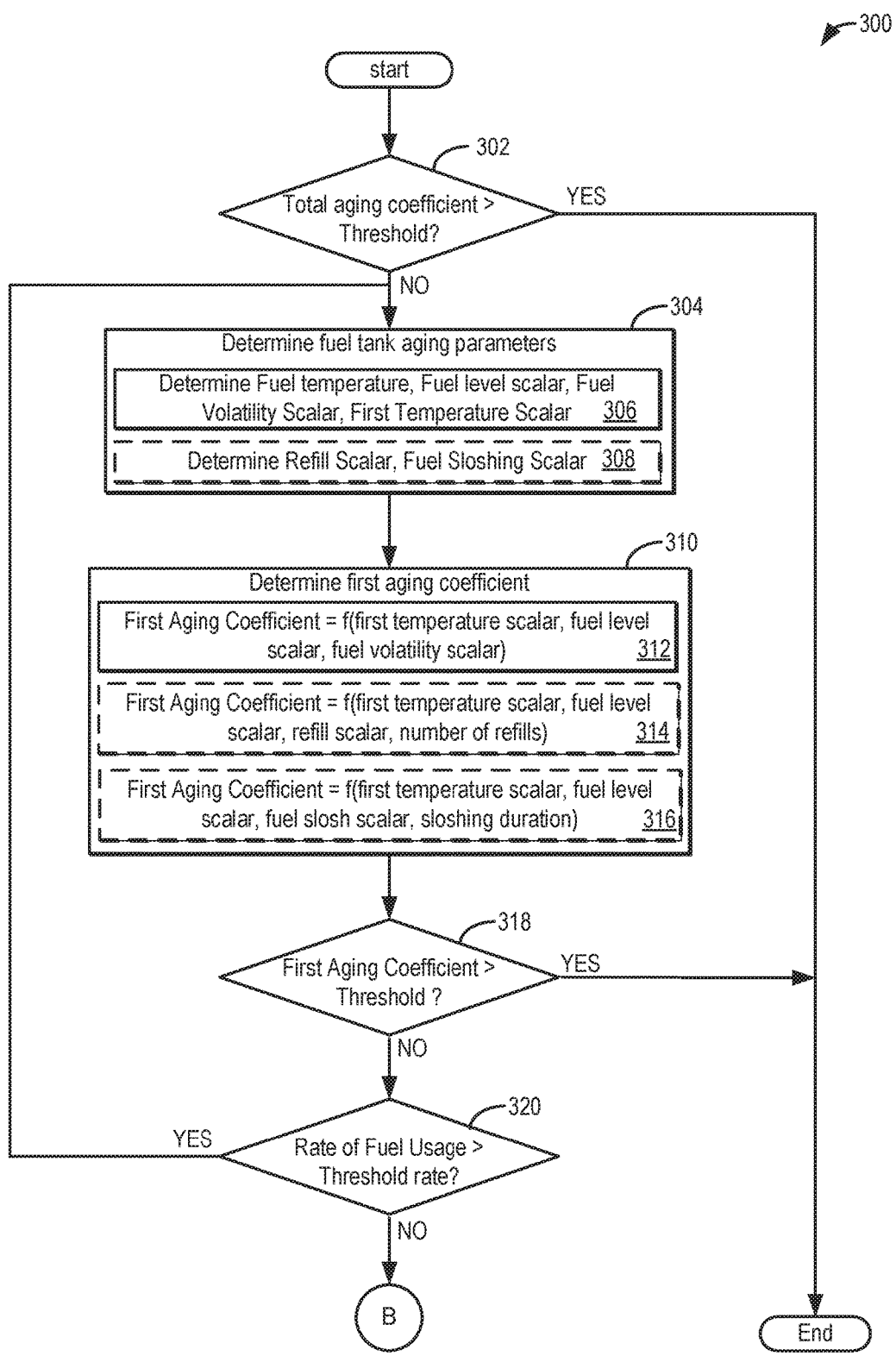
FIG. 3A shows a flow chart illustrating an example routine for on-board aging of a fuel tank.
Figure 4:
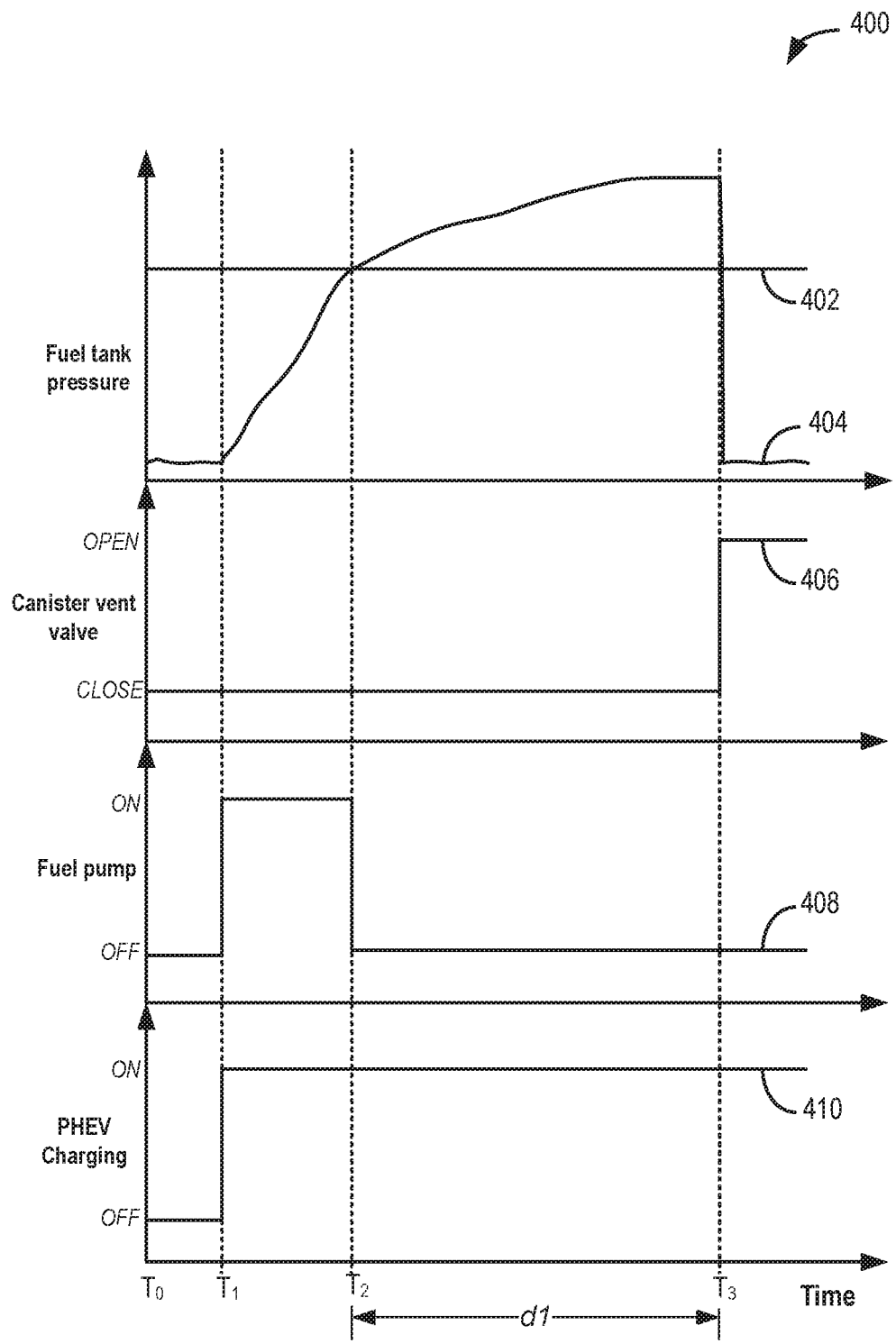
FIG. 4 shows an example aging of the fuel tank.

FIG. 3A shows a flowchart illustrating a method 300 for aging a fuel tank. In particular, method 300 may be performed for expediting aging of a fuel tank that is at least partially composed of a plastic polymer, such as fuel tank 144 at FIG. 1 and/or fuel tank 220 at FIG. 2. The tank may be a newly installed plastic fuel tank in a plug-in hybrid electric vehicle (PHEV) system, such as vehicle system 100 at FIG. 1 and/or vehicle system 206 at FIG. 2. Instructions for carrying out method 300 and other methods included herein may be executed by a controller, such as a controller included in control system 190 at FIG. 1 and/or controller 212 at FIG. 2, based on instructions stored in non-transitory memory of the controller, and in conjunction with signals received from sensors of the fuel and vehicle systems, such as the sensors described above with reference to FIGS. 1, and 2. The controller may employ actuators of the vehicle system to adjust vehicle operation, according to the methods described below. While described with reference to the systems depicted in FIGS. 1 and 2, it should be understood that method 300 or similar methods may be applied to other systems without departing from the scope of this disclosure.

Method begins at 302. At 302, method 300 includes judging if a total aging coefficient is greater than a desired aging coefficient. The total aging coefficient may indicate conditioning degree of aging of the plastic fuel tank. A latest value of the total aging coefficient may be stored in a memory of the controller and thus, the total aging coefficient may be retrieved from the memory. The total aging coefficient may be based on a first coefficient of aging and a second coefficient of aging. The first coefficient of aging may represent a natural aging of the fuel tank that occurs due to fuel consumption, refueling, and soak. The first coefficient of aging may also take into account preconditioning that has been performed by a vehicle manufacturer prior to installing the plastic tank within the vehicle. The second coefficient of aging may represent an induced aging of the fuel tank that is performed onboard the vehicle after the fuel tank has been installed within the vehicle and while the vehicle is in use by a consumer. Details of determining the first aging coefficient, the second aging coefficient, and the total aging coefficient will be discussed below. If method 300 judges that the total aging coefficient is greater than the desired aging coefficient, the fuel tank has been aged, in that the fuel tank has achieved dimensional equilibrium. Thus, the answer at 302 is YES and the method proceeds to exit. However, if the answer at 302 is NO, conditioning of the fuel tank in incomplete, and the method proceeds to 304.

At 304, method 300 includes determining fuel tank aging parameters. As indicated at 306, determining the fuel tank aging parameters may include determining a fuel level scalar, a fuel volatility scalar, and a first temperature scalar. The fuel level scalar may indicate a duration when the fuel in the fuel tank is at or above half level. For example, when the fuel tank is at or above half level, the fuel level scalar may take a value based on a duration the fuel in the tank remains at or above half level; otherwise, when the fuel tank is below half level, the fuel level scalar may take a value of "0". The fuel volatility scalar may be a Reid Vapor Pressure value of a current fuel blend present in the fuel tank. The fuel level may be determined based on indications from a fuel level sensor, such as fuel level sensor 143 at FIG. 1 and/or sensor 234 at FIG. 2. The fuel temperature may be determined based on an indication from a fuel temperature sensor, such as fuel temperature sensor 142 at FIG. 1 and/or fuel temperature sensor 299 at FIG. 2. The RVP of the current fuel blend may be in a variety of ways. For example, RVP may be based on ideal gas law and fuel tank temperature and pressure sensor measurements. Further, RVP may be based on a fuel alcohol content, as estimated based on the output of an exhaust gas oxygen sensor. Still further, other approaches may be used, such as activating the fuel pump (without operating the engine) to increase fuel tank pressure, and comparing a peak pressure value to predetermined data for known fuel RVPs stored in a look-up table of the controller. The first temperature scalar may represent an average fuel tank temperature for the duration the fuel tank is at or above half level.

In some examples, additionally or alternatively, determining fuel tank aging parameters may include, at 308, determining a refueling scalar, a number of refueling events during which the fuel tank was refueled to a predetermined level, and a fuel sloshing scalar. The refueling scalar may take a value of "1" when the fuel tank is refueled to the predetermined level during a refueling event; otherwise, when the fuel tank is refueled to below the predetermined level, the refueling scalar may be set to "0". The fuel sloshing scalar may indicate a degree of fuel sloshing that may generate fuel vapors, which may facilitate the aging process for the fuel tank. The degree of fuel sloshing may be based on one or more of variations in fuel level indication from the fuel sensor, variations in fuel tank pressure indications from a fuel pressure sensor (e.g., fuel tank pressure sensor 141 at FIG. 1 and/or FTPT 291 at FIG. 2) etc. The refueling scalar may be determined based on a fuel level indication after the refueling events. The number of refueling events may be determined based on changes in fuel level indications from the fuel level sensor, for example. In some examples, the number of refueling events may be determined based on a number of actuations of a refueling button, such as refueling button 197 at FIG. 1.

Upon determining the fuel tank aging parameters, method 300 proceeds to 310. At 310, method 300 includes determining the first aging coefficient. In a first example, the first aging coefficient may be determined as a function of the first temperature scalar, fuel level scalar, and fuel volatility scalar. For example, the first aging coefficient may be determined as a summation of the product of first temperature scalar, the fuel level scalar, and the fuel volatility scalar for the durations the fuel level was at or above the half level. Thus, the first aging coefficient may be represented by the following equation:

$$\text{First aging coefficient } CA1 = \sum_{i=1}^{n} \text{first temperature scalar}(i) * \text{fuel level scalar}(i) * \text{fuel volatility scalar}(i)$$

Where, i represents a period when the fuel level is at or above half level, such as a first duration when the fuel level is at or above half level, a second duration when the fuel level is at or above half level, and so on until nth duration when the fuel level is at or above half level. Between the subsequent durations (e.g., between first and second durations, second and third durations, etc.), the fuel level is below half level.

Alternatively, in a second example, as indicated at 314, first aging coefficient may be determined as a function of the first temperature scalar, refueling scalar, and a number of refueling events. For example, the first aging coefficient may be determined by the following equation:

$$\text{First aging coefficient } CA1 = \left(\sum_{i=1}^{n} \text{first temperature scalar}(i) * \text{fuel level scalar}(i)\right) +$$
$$(\text{refueling scalar} * \text{number of refueling events})$$

Where, i represents a period when the fuel level is at or above half level, such as a first duration when the fuel level is at or above half level, a second duration when the fuel level is at or above half level, and so on until nth duration when the fuel level is at or above half level. Between the subsequent durations (e.g., between first and second durations, second and third durations, etc.), the fuel level is below half level.

Alternatively, in a third example, as indicated at 316, first aging coefficient may be determined as a function of the first temperature scalar, fuel slosh scalar, and a slosh duration. For example, the first aging coefficient may be determined by the following equation:

$$\text{First aging coefficient } CA1 = \left(\sum_{i=1}^{n} \text{first temperature scalar}(i) * \text{fuel level scalar}(i)\right) +$$
$$(\text{fuel slosh scalar} * d)$$

Where, i represents a period when the fuel level is at or above half level, such as a first duration when the fuel level is at or above half level, a second duration when the fuel level is at or above half level, and so on until nth duration when the fuel level is at or above half level; and "d" represents a duration of fuel sloshing. Between the subsequent durations (e.g., between first and second durations, second and third durations, etc.), the fuel level is below half level.

Upon determining the first aging coefficient CA1, method 300 proceeds to 318. At 318, method 300 includes judging if the first aging coefficient is greater than a first threshold coefficient. In one example, when the first aging coefficient is determined as a function of the first temperature scalar, fuel level scalar, and fuel volatility scalar, the first threshold coefficient may be based on the first temperature scalar (i.e., average fuel temperature for the duration the fuel tank is at or above the half level). For example, if the first temperature scalar lies within a first lower temperature range, the first threshold coefficient may be greater than when the first temperature scalar lies within a second higher temperature range. The first temperature range may include a first minimum and first maximum temperature. The first minimum temperature may be less than a second minimum temperature of the second temperature range, and the first maximum temperature may be less than a second maximum temperature of the second temperature range. In some examples, the first threshold coefficient may increase as the first temperature scalar decreases. That is, the first threshold coefficient may be inversely proportional to fuel temperature.

In a second example, when the first aging coefficient is based on the number of refueling events, the first threshold coefficient may be based on the first temperature scalar and further adjusted for refueling.

In a third example, when the first aging coefficient is based on fuel sloshing conditions, the first threshold coefficient may be based on the first temperature scalar and further adjusted for fuel sloshing.

If the first aging coefficient is greater than the first threshold coefficient, the answer at 318 is YES and method 300 proceeds to exit. However, if the first aging coefficient is not greater than the first threshold coefficient, method 300 proceeds to 320. At 320, method 300 judges if a rate of fuel usage is greater than a threshold rate. The rate of fuel usage may be based on a distance driven and an amount of fuel consumed. If the rate of fuel usage is greater than the threshold rate, the answer at 320 is YES and method 300 returns to 304 to determine fuel tank aging parameters and first aging coefficient as discussed above. As long as the fuel usage is above the threshold, the fuel tank may be allowed to condition naturally from refueling and fuel soak. Therefore, if the fuel usage rate is greater than the threshold, even though the first aging coefficient is less than the first threshold coefficient, onboard aging may not be induced and natural aging from refueling and fuel soak may be allowed to age the fuel tank. However, if the rate of fuel usage is less than the threshold rate, it may be inferred that the PHEV is driven exclusively in electric mode. Accordingly, if the answer at 320 is NO, method 300 proceeds to 321 at FIG. 3B for initiating onboard aging of the fuel tank.

Figure 3B:
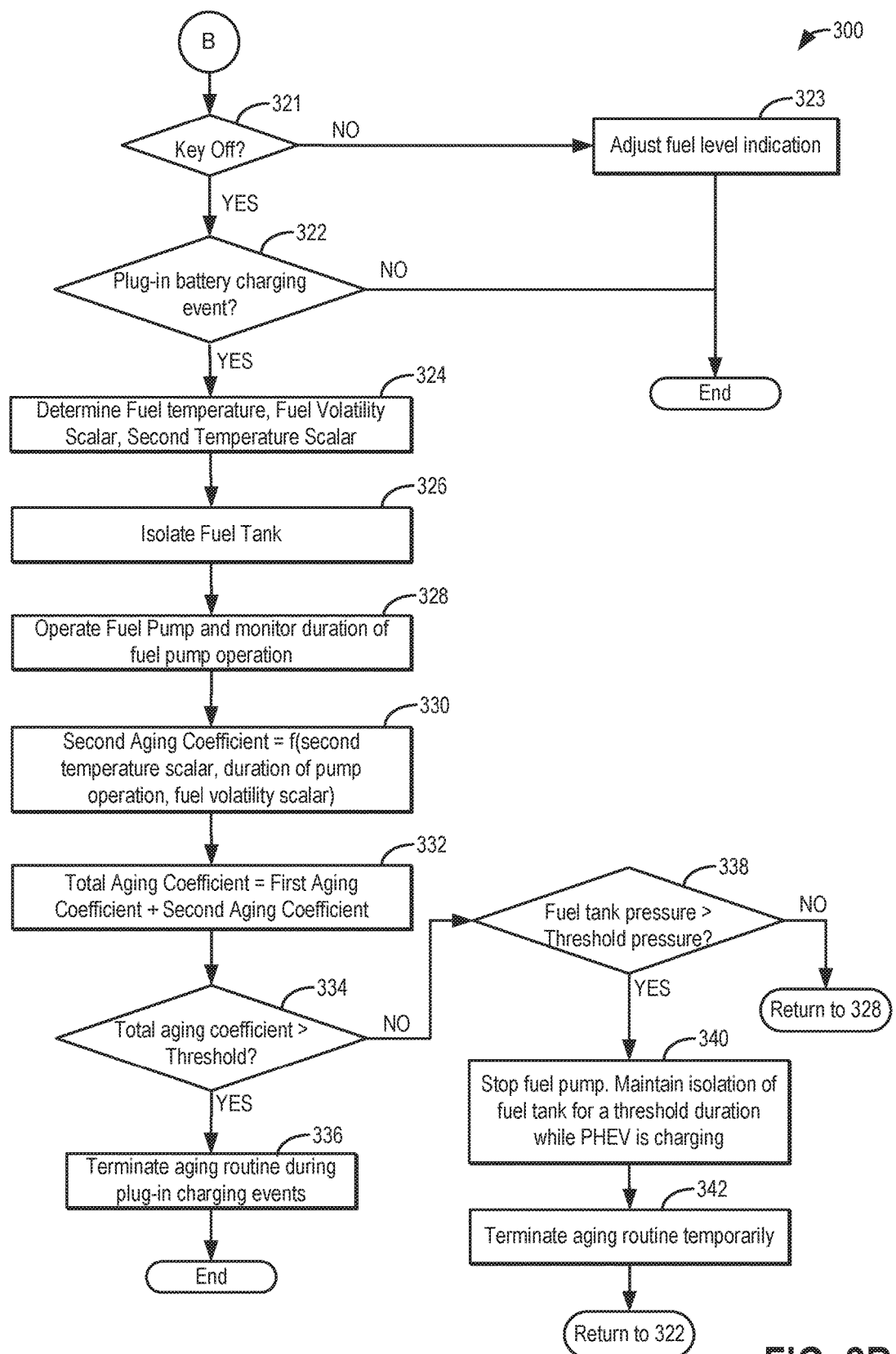
FIG. 3B is a continuation of FIG. 3A.

Turning to FIG. 3B, at 321, method 300 includes judging if a key OFF event is detected. For example, in an active key-based vehicle configuration, a key-off event may be determined based on a position of a key slot in to which the active key is inserted. As a second example, in vehicles configured with start/stop button, the key-off condition may be a vehicle-off condition. The vehicle-off condition may include a stop button actuated condition. In such embodiments, the vehicle may include a key that is inserted into a slot, as well as an additional button that may be alternated between a start position and a stop position. As a third example, in vehicles configured with a passive key, a vehicle-off condition may include the passive key being outside a threshold distance of the vehicle. The passive key may include an ID tag, such as an RFID tag, or a wireless communication device with a specified encrypted code. An additional start/stop button may be provided that can be alternated between a start position and a stop position to accordingly start or stop the vehicle engine. If a key OFF event is detected, the answer at 321 is YES and method 300 proceeds to 322.

At 322, method 300 includes determining if a plug-in battery charging event is in-progress. Specifically, it may be determined if an on-board energy storing device (also referred to herein as battery), such as device 150 at FIG. 1, is drawing electricity from a grid, such as power distribution system 152 at FIG. 1. The energy storage device may be a high voltage battery, which may be utilized for powering a motor of the PHEV, such as motor 120 at FIG. 1, during an electric mode of operation. Accordingly, judging if a battery charging event is in progress may include determining whether or not an electrical connection has been established between an on-board charger, such as charger 158 at FIG. 1, coupled to the battery, and an off-board charging station, such as charging station 154 at FIG. 1, electrically connected to the grid. The electrical connection requires that a charging plug coupled the charger and a charging receptacle of the charging station, such as receptacle 181 at FIG. 1, are engaged with one another to achieve proper electrical continuity such that charging current may flow from the charging station to the on-board energy storage device when charging commences. The condition in which the on-board charger is properly connected with the charging station so that charging of the vehicle battery may begin is referred to as the "on-plug" condition.

Once the on-plug condition is confirmed, current flow to charge the battery may still not occur until other vehicle systems are in respective conditions appropriate for charging. For example, charging may not be enabled until the controller and/or on-board charger receive signals indicating that a vehicle transmission is in a PARK mode. Therefore, in addition to confirming that the on-board charger is connected to the charging station, it may be determined if current flow from the charging station to the battery is detected. Thus, if the on-board charger is electrically connected to the charging station and if a current flow from the charging station to the energy storage device is detected, the answer at 322 is YES and the plug-in battery charging event is confirmed. Method 300 then proceeds to 324. Otherwise, method 300 proceeds to exit.

In some examples, additionally, it may be determined if the plug-in charging event is underway during OFF peak hours. If the plug-in charging event occurs during OFF peak hours, then method 300 may proceed to 324; otherwise, method 300 may wait until a cost of charging the battery decreases below a threshold cost.

At 324, upon confirming the plug-in battery charging event, method 300 includes determining a fuel temperature, a fuel volatility scalar, and a second temperature scalar. The fuel temperature may be determined based on indication from a fuel temperature sensor within a fuel tank of the PHEV; the fuel volatility scalar may be based on a RVP of a current fuel blend within the fuel tank; and the second temperature scalar may be determined based on the fuel temperature. In one example, the second temperature scalar may be normalized with respect to ambient temperature.

Upon determining the fuel temperature, the fuel volatility scalar and the second temperature scalar, method 300 proceeds to 326.

At 326, method 300 includes isolating the fuel tank. Isolating the fuel tank may include isolating the fuel tank from the engine and from the atmosphere. Accordingly, isolating the fuel tank may include closing a fuel tank isolation valve (FTIV), such as FTIV 252 at FIG. 2, and closing a canister vent valve (CVV), such as CVV 229 at FIG. 2. For example, the controller may send electrical signals to an FTIV actuator and a CVV actuator to close the FTIV and the CVV. Upon isolating the fuel tank, method 300 proceeds to 328.

At 328, method 300 includes activating the fuel pump (without operating the engine) to generate fuel vapors within the fuel tank. For example, the controller may send an electrical signal to the fuel pump to activate a motor included in the fuel pump. Additionally, at 328, method 300 includes monitoring a duration of operation of the fuel pump. Method 300 then proceeds to 330.

In one example, during the on-board aging process when the battery is charging, the fuel tank is isolated and the fuel pump is operating, the controller may prevent refueling of the fuel tank. Alternatively, during the on-board aging process, if the refueling button is actuated while the fuel pump is operating, the controller may terminate the operation of the fuel pump and vent the fuel vapors in the tank to the atmosphere until a predetermined pressure (e.g., atmospheric pressure) by opening the FTIV and the CVV in order to enable a refueling event. However, if the battery continues to be charged by the grid and/or the electrical connection between the battery and the charging station is not terminated, the controller may provide an indication to the operator, via a vehicle instrument panel for example, that the battery charging event is in progress. Further, in some examples, the controller may prevent refueling until the electrical connection between the battery and the charging station is terminated.

At 330, method 300 includes determining a second aging coefficient CA2. The second aging coefficient is determined a function of the second temperature scalar, the fuel volatility scalar and a duration of pump operation. Specifically, in one example, the second aging coefficient may be determined based on the following equation:

$$\text{Second aging coefficient } CA2 = \sum_{j=1}^{n} \text{second temperature scalar}(j) * \text{duration of pump operation}(j) * \text{fuel volatility scalar}(j)$$

Where, j represents a period when the fuel pump is activated during a plug-in charging event, such as a first period during a first charging event when the fuel pump is activated, a second period during a second charging event when the fuel pump is activated, and so on until nth period when the fuel pump is activated while the battery is charging. Thus, the second aging coefficient CA2 is a summation of product of the second temperature scalar, the duration of pump operation and the fuel volatility scalar during the periods when the fuel pump is activated while the battery charging is in progress. In this way, the controller monitors the total duration of time the fuel pump has operated while taking into account the ambient and fuel temperatures at the time of fuel pump operation and the fuel volatility. Upon determining the second aging coefficient CA2, method 300 proceeds to 332.

At 332, method 300 includes determining a total aging coefficient. The total aging coefficient may be determined as a sum of the first aging coefficient and the second aging coefficient.

Next, at 334, method 300 includes determining if the total aging coefficient is greater than a threshold total coefficient. In one example, the threshold total coefficient may be based on an ambient temperature during which the pump was operated. For example, cooler ambient temperatures may require longer times for the fuel tank to age. Therefore, when the ambient temperatures are lower, the threshold coefficient may be higher. If the total aging coefficient is greater than the threshold total coefficient, the answer at 334 is YES and method 300 proceeds to 336.

At 336, method 300 includes terminating the aging routine during the plug-in charging events. Terminating the aging routine may include stopping the fuel pump, adjusting the CVV to an open position (e.g., by de-energizing a canister vent solenoid), and adjusting the FTIV to an open position. Further, in some examples, the controller may set a flag to indicate that the fuel tank has been aged and the aging routine may not be initiated until the aged fuel tank is replaced with a green fuel tank (that is, fuel tank that has not been aged) during the lifecycle of the PHEV.

Returning to 334, if the total aging coefficient is not greater than the threshold coefficient, the method proceeds to 338. At 338, method 300 includes judging if the fuel tank pressure is greater than a threshold pressure. If the fuel tank pressure is greater than a threshold, the answer at 338 is YES and accordingly, method 300 proceeds to 340. At 340, method 300 includes stopping fuel pump operation. However, isolation of fuel tank may be maintained for a threshold duration while the battery continues to be charged and after the fuel pump has been stopped. The isolation of fuel tank may be maintained in order to allow the released fuel vapors to react with the fuel tank walls and thereby, accelerate the aging process. In one example, the isolation of fuel tank may be maintained until the current charging cycle is completed.

Next, after maintaining the isolation of fuel tank for the threshold duration, method 300 proceeds to 342. At 342, method 300 includes temporarily terminating the aging routine. Terminating the aging routine includes opening the FTIV and the CVV. Further, in some examples, the controller may set a flag to resume the aging routine after a threshold duration during the current charging cycle or set a flag to resume the aging routine during the next subsequent recharging cycle when the PHEV draws current from the grid. Accordingly, upon terminating the aging routine, method 300 returns to 322 to determine the PHEV battery charging status and proceeds as discussed above.

Returning to 338, if the fuel tank pressure is not greater than the threshold pressure, method 300 returns to 328 to continue operating the pump and monitoring the duration of pump operation as discussed above.

In this way, during early miles in service of a PHEV vehicle or when a green fuel tank at least partly composed of plastic is installed in a PHEV vehicle, the fuel tank may be conditioned by powering the fuel pump via the PHEV battery during conditions when the PHEV battery is being charged via the grid. As a result, the fuel tank aging may be accelerated, which in turn may improve the accuracy of fuel level indications.

Turning to FIG. 4, an example operating sequence for aging a green fuel tank is shown. The sequence of FIG. 4 may be provided by the system of FIGS. 1 and 2, according to the method of FIGS. 3A and 3B. Specifically, the sequence of FIG. 4 may be performed in response to a total aging coefficient less than a threshold total aging coefficient during PHEV battery charging conditions when the battery is being charged by utilizing grid power. By performing the operating sequence of FIG. 4, conditioning or aging of the fuel tank may be expedited. The total aging coefficient may be determined as discussed above with respect to FIGS. 3A and 3B. Briefly, the total aging coefficient may be determined based on a first aging coefficient and a second aging coefficient. The first aging coefficient may be based on one or more of fuel temperature, fuel volatility; number of times the plastic fuel tank is refilled to the preset level; pressure in the fuel tank; and fuel sloshing. The second aging coefficient may be based on fuel volatility; fuel temperature while the fuel pump is operated during the plug-in events; duration the fuel pump is operated during the plug-in events; and pressure in the fuel tank.

Vertical markers are shown at times $T_0$-$T_3$ to identify particular times of interest during the sequence.

The first plot from the top of FIG. 4 represents fuel tank pressure versus time. The Y axis represents fuel tank pressure and fuel tank pressure increases in the direction of the Y axis arrow. Horizontal marker 402 represents threshold fuel tank pressure.

The second plot from the top of FIG. 4 represents position of canister vent valve (CVV) versus time. The Y axis represents the position of canister vent valve and the position of the CVV changes from a fully closed position to a fully open position in the direction of the Y axis arrow.

The third plot from the top of FIG. 4 represents an operating status of fuel pump versus time. The Y axis represents an ON (active) or an OFF (inactive) status of the fuel pump. The fuel pump is ON (active) when the signal is at a high level. The fuel pump is OFF (inactive) when the signal is at a lower level.

The fourth plot from the top of FIG. 4 represents a charging condition for PHEV battery. The Y axis represents an active or inactive charging status of the PHEV battery. The PHEV battery is actively charging utilizing current from the power grid when the signal is at a high level. The PHEV battery is not charging (that is, no current is drawn from the grid) when the signal is at a lower level.

In all the plots discussed above, the X axis represents time and time increases from the left side of the plots to the right side of the plots.

At time $T_0$, the PHEV battery is not charging (plot 410). In one example, the battery may be electrically connected to the power distribution grid via a plug and an outlet at a charging station. However, the PHEV may not be in a park mode. Therefore, the PHEV, while connected to the grid, may not draw current from the grid. In another example, the battery may not be electrically connected to the power grid and hence, charging of the battery may not be initiated. In response to the battery not being charged by utilizing grid-power, at $T_0$, the fuel pump may not be activated (plot 408). Further, at $T_0$, the CVV may be in a closed position (plot 406) and a fuel tank temperature may be stable (not shown). When the CVV is closed and the fuel tank temperature is stable, the fuel tank pressure is stable (plot 404).

At time $T_1$, the PHEV battery is charging by utilizing current from the grid. When the PHEV battery is charging, the fuel system is isolated from the atmosphere and the engine by closing the CVV (plot 406) and the FTIV (not shown). Simultaneously or immediately after isolating the fuel system, the controller activates the fuel pump. Due to the operation of the fuel pump, between $T_1$ and $T_2$, the fuel in the fuel tank is agitated, which cause the fuel to vaporize resulting in an increase in an amount of fuel vapors in the tank. As the fuel tank is isolated, when the fuel pump is active the pressure builds up in the fuel tank due to accumulation of fuel vapors. The fuel vapors adhere to the fuel tank walls, chemically react with the walls and expedite the aging process.

While the present example illustrates isolation of the fuel tank and activation of the fuel pump responsive to initiation of charging of the PHEV battery, it will be appreciated that in some examples, the isolation of fuel tank and activation of the fuel pump may be initiated responsive to a state of charge of the PHEV battery remaining at or above a threshold state of charge during the charging event.

At $T_2$, the fuel tank pressure reaches a threshold pressure (402), responsive to which, the fuel pump is deactivated (plot 408). The threshold pressure may be based on a size of the fuel tank and a pressure tolerance limit of the fuel tank, for example. However, at $T_2$, the isolation of the fuel tank may be maintained for a threshold duration (which is "d1" in this example) while the PHEV battery continues to draw current from the grid in order to allow the fuel vapors to react with the fuel tank and thereby, facilitate the aging process. After the threshold duration has elapsed, the CVV may be opened (plot 406) and the FTIV (not shown) may be opened. In one example, the threshold duration may be based on an ambient temperature. For example, if the ambient temperatures are lower, the threshold duration may be longer, and vice versa. In another example, the fuel tank isolation may be maintained as long as the PHEV battery continues to charge via the grid power. In such cases, the threshold duration may be based on a duration of charging of the PHEV battery.

At $T_3$, after maintaining the fuel tank isolation for the threshold duration "d", the CVV (plot 406) and the FTIV (not shown) are opened to release the pressure in the fuel tank. While the present example shows opening the CVV after the threshold duration "d1", in other examples, the CVV (and the FTIV) may be opened in response to termination of charging of the PHEV battery.

In this way, in response to the total aging coefficient less than the threshold coefficient, during key-off conditions when the PHEV battery is being charged by grid power, the fuel tank is isolated and the fuel pump is activated to generate fuel vapors that then interact with the fuel tank walls to expedite aging of the fuel tank. The isolation of fuel tank and activation of fuel pump may be performed during PHEV battery charging conditions until the fuel tank is aged to a desired degree (that is, until the total aging coefficient reaches the threshold total coefficient).

As one embodiment, a method for a plug-in hybrid vehicle includes during a plug-in event to recharge a battery of the vehicle, isolating a plastic fuel tank from both an internal combustion engine of the vehicle and from atmosphere; and operating a fuel pump coupled to the plastic fuel tank during each of a plurality of the plug-in events until the plastic fuel tank becomes aged to a predetermined degree by fuel vapors generated therein. A first example of the method includes wherein the plastic fuel tank aging is directly related to temperature of fuel in the plastic fuel tank. A second example of the method optionally includes the first example and further includes wherein the plastic fuel tank aging is directly related to operating time of the fuel pump during the plug-in events. A third example of the method optionally includes one of the first and second examples, and further includes wherein the plastic fuel tank aging is directly related to volatility of fuel in the plastic fuel tank. A fourth example of the method optionally includes one or more of the first through third examples, and further includes, wherein the plastic fuel tank aging is related to pressure in the plastic fuel tank during the plug-in events. A fifth example of the method optionally includes one or more of the first through fourth examples, and further includes, shutting off the fuel pump during the plug-in events when pressure in the plastic fuel tank reaches a preset pressure. A sixth example of the method optionally includes one or more of the first through fifth examples, and further includes, wherein the plug-in event comprises recharging a battery which supplies electrical power to an electric motor which propels the vehicle under certain operating conditions. A seventh example of the method optionally includes one or more of the first through sixth examples, and further includes, wherein the aging is related to a chemical reaction between the plastic fuel tank and the fuel vapors. An eighth example of the method optionally includes one or more of the first through seventh examples, and further includes, wherein the aging reduces flexibility of the plastic fuel tank.

As another embodiment, a method for a plug-in hybrid vehicle, comprising: estimating aging of a plastic fuel tank which supplies fuel to a combustion engine of the vehicle in relation how much time the fuel tank is at a fuel level over a preset level and fuel temperature during those times; during plug-in events in which a battery of the vehicle is recharged from the power grid, sealing a plastic fuel tank which is coupled to an engine of the vehicle so that the plastic fuel tank is isolated from both the engine and from atmosphere; operating a fuel pump coupled to the plastic fuel tank during each of the plug-in events; estimating aging of the tank during each of the plug-in events and generating a total aging estimate from both filling the plastic fuel tank over the preset level and operating the fuel pump during the plug-in events; and stopping operation of the fuel pump during the plug-in events when the total aging estimate reaches the desired aging estimate. A first example of the method includes wherein the fuel pump operation during the plug-in events is enabled if the aging estimate based in part on fuel level does not reach the desired aging estimate within a predetermined time. A second example of the method optionally includes the first example and further includes wherein the estimate of aging based in part on fuel level comprises a first aging coefficient and the estimate of aging during the plug-in events comprises a second coefficient of aging and the total aging estimate comprises a summation of the first aging coefficient and the second aging coefficient. A third example of the method optionally includes one or more of the first and second examples, and further includes wherein the first aging coefficient is further related to one or more of the following: fuel volatility; number of times the plastic fuel tank is refilled to the preset level; pressure in the fuel tank; and fuel sloshing. A fourth example of the method optionally includes one or more of the first through third examples, and further includes, wherein the fuel sloshing is based on one or more of the following: speed of the vehicle; braking force; vehicular acceleration; and lateral acceleration. A fifth example of the method optionally includes one or more of the first through fourth examples, and further includes, wherein the second aging coefficient is further related to one or more of the following: fuel volatility; fuel temperature while the fuel pump is operated during the plug-in events; time the fuel pump is operated during the plug-in events; and pressure in the fuel tank.

As another embodiment, a system includes an internal combustion engine coupled to one or more drive wheels of a vehicle; a plastic fuel tank coupled to the engine; a fuel pump positioned in the plastic fuel tank and the engine; an electric motor coupled to the one or more drive wheels; a battery coupled to the electric motor; a recharging mechanism coupled to the battery and adapted to receive electrical power when plugged into the power grid during operator initiated plug-in events when the vehicle is stationary; and a controller configured with instructions stored in non-transitory memory, that when executed during the plug-in events cause the controller to: seal the plastic fuel tank from the engine and from atmosphere; actuate the fuel pump; and prevent the electric fuel pump from operating during future plug-in events based on time the pump has run during the plug-in events and temperature of fuel in the plastic fuel tank while the pump is operating during the plug-in events. A first example of the system includes wherein preventing the electric fuel pump from operating during future plug-in events is further based on pressure in the fuel tank during the plug-in events. A second example of the system optionally includes the first example and further includes a vapor storage canister coupled to the plastic fuel tank and coupled through a purge control valve to the engine. A third example of the system optionally includes one or more of the first and second examples, and further includes opening the purge control valve when the engine is operated. A fourth example of the method optionally includes one or more of the first through third examples, and further includes, venting the vapor storage canister to atmosphere until pressure in the plastic fuel tank has reached a predetermined pressure before initiating a refill of the plastic fuel tank.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a plug-in hybrid vehicle, comprising:
during a plurality of plug-in events to recharge a battery of the vehicle, isolate contents within a plastic fuel tank from both an internal combustion engine of the vehicle and from atmosphere; and
operating a fuel pump coupled to the plastic fuel tank during each of the plurality of the plug-in events until the plastic fuel tank becomes aged to a predetermined degree by fuel vapors generated therein, where aging the plastic fuel tank to the predetermined degree is expanding the plastic fuel tank to a dimensional equilibrium.

2. The method of claim 1, wherein the plastic fuel tank aging is directly related to a temperature of fuel in the plastic fuel tank.

3. The method of claim 1, wherein the plastic fuel tank aging is directly related to an operating time of the fuel pump during the plurality of plug-in events.

4. The method of claim 1, wherein the contents include fuel, and wherein the plastic fuel tank aging is directly related to a fuel volatility scalar of the fuel in the plastic fuel tank.

5. The method of claim 1, wherein the plastic fuel tank aging is related to a fuel pressure in the plastic fuel tank during the plurality of plug-in events.

6. The method of claim 1, further comprising shutting off the fuel pump during the plurality of plug-in events when a fuel pressure in the plastic fuel tank reaches a preset pressure.

7. The method of claim 1, wherein the plurality of plug-in event comprise recharging the battery which supplies electrical power to an electric motor which propels the vehicle under certain operating conditions.

8. The method of claim 1, wherein the aging is related to a chemical reaction between the plastic fuel tank and the fuel vapors.

9. The method of claim 8, wherein the aging reduces flexibility of the plastic fuel tank.

* * * * *